United States Patent [19]

Vick

[11] Patent Number: 4,699,428
[45] Date of Patent: Oct. 13, 1987

[54] TAILGATE AND DUMP BODY ASSEMBLY

[76] Inventor: Henry L. Vick, 939 Hickory Cir., Birmingham, Ala. 35215

[21] Appl. No.: 854,114

[22] Filed: Apr. 21, 1986

[51] Int. Cl.$^4$ .............................................. B60P 1/26
[52] U.S. Cl. ............................... 298/23 MD; 296/184; 298/23 D
[58] Field of Search .......................... 296/184, 56, 58; 298/23 R, 23 MD, 23 S, 23 D

[56] References Cited

U.S. PATENT DOCUMENTS

| 2,213,385 | 9/1940 | Dailey | 298/23 D |
|---|---|---|---|
| 3,814,479 | 6/1974 | Vornberger | 296/184 X |
| 3,830,542 | 8/1974 | Lablanche | 296/56 |
| 3,873,149 | 3/1975 | Churchman | 296/56 |
| 4,165,897 | 8/1979 | Schmidt | 298/23 R X |

FOREIGN PATENT DOCUMENTS

| 56-39934 | 4/1981 | Japan | 298/24 MD |
| 112367 | 9/1981 | Japan | 296/184 |

Primary Examiner—Frank E. Werner
Assistant Examiner—Janice Krizek
Attorney, Agent, or Firm—Jennings, Carter, Thompson & Veal

[57] ABSTRACT

A tailgate and dump body assembly for use on dump trucks or trailers utilizes a plurality of U-shaped structural steel elements in a unitized body to prevent lateral deformation and vibration. The dump body terminates in one such element and the tailgate seats against this element when closed. The tailgate is pivotally mounted at the top to a linkage which lowers and raises the tailgate into and out of wedge-like engagement with an inclined stop member affixed to the rear of the dump body. Raising the tailgate permits it to swing open upon elevation of the dump body while lowering the tailgate into engagement with the stop member prevents inadvertent opening of the gate.

11 Claims, 8 Drawing Figures

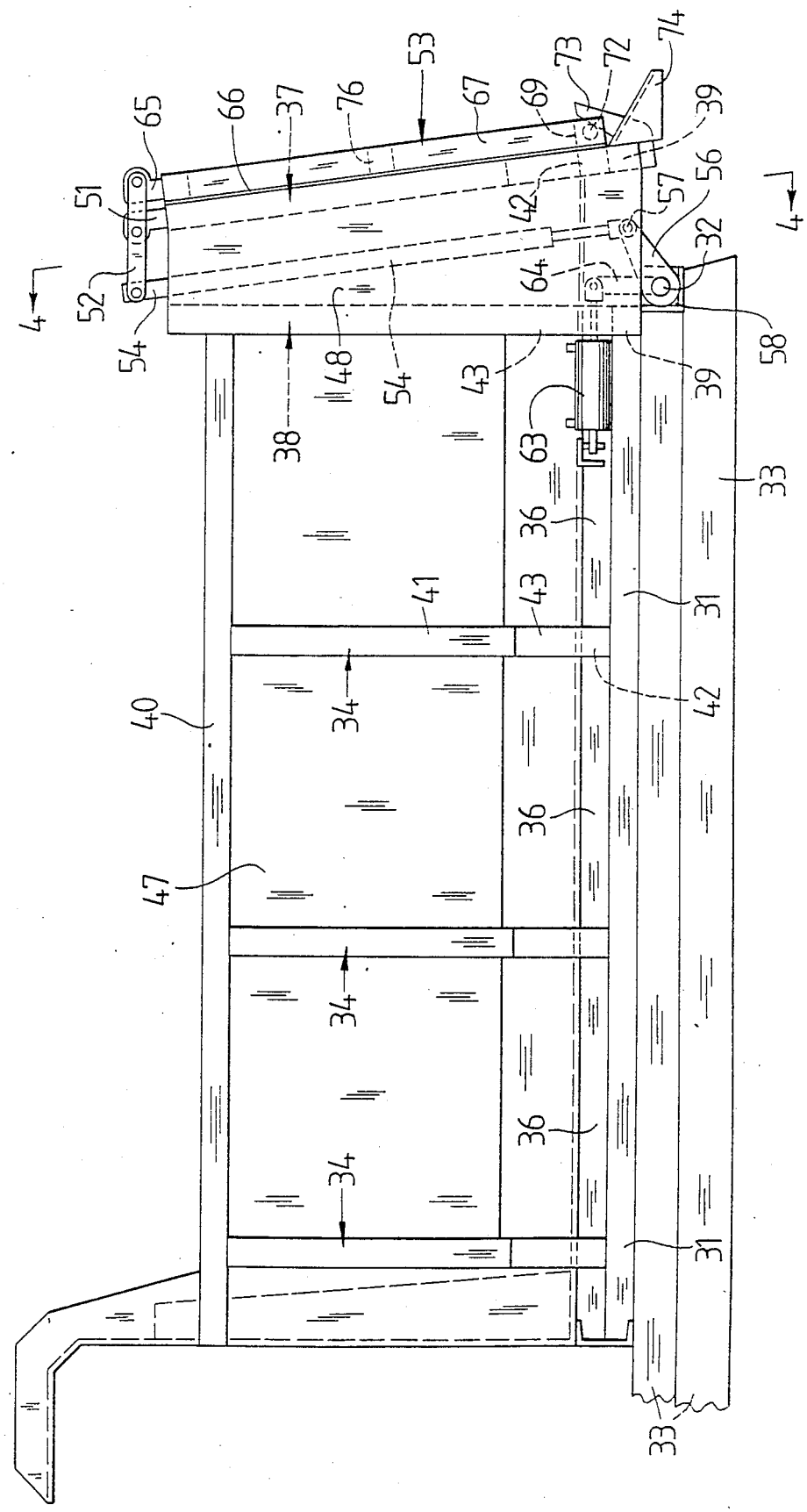

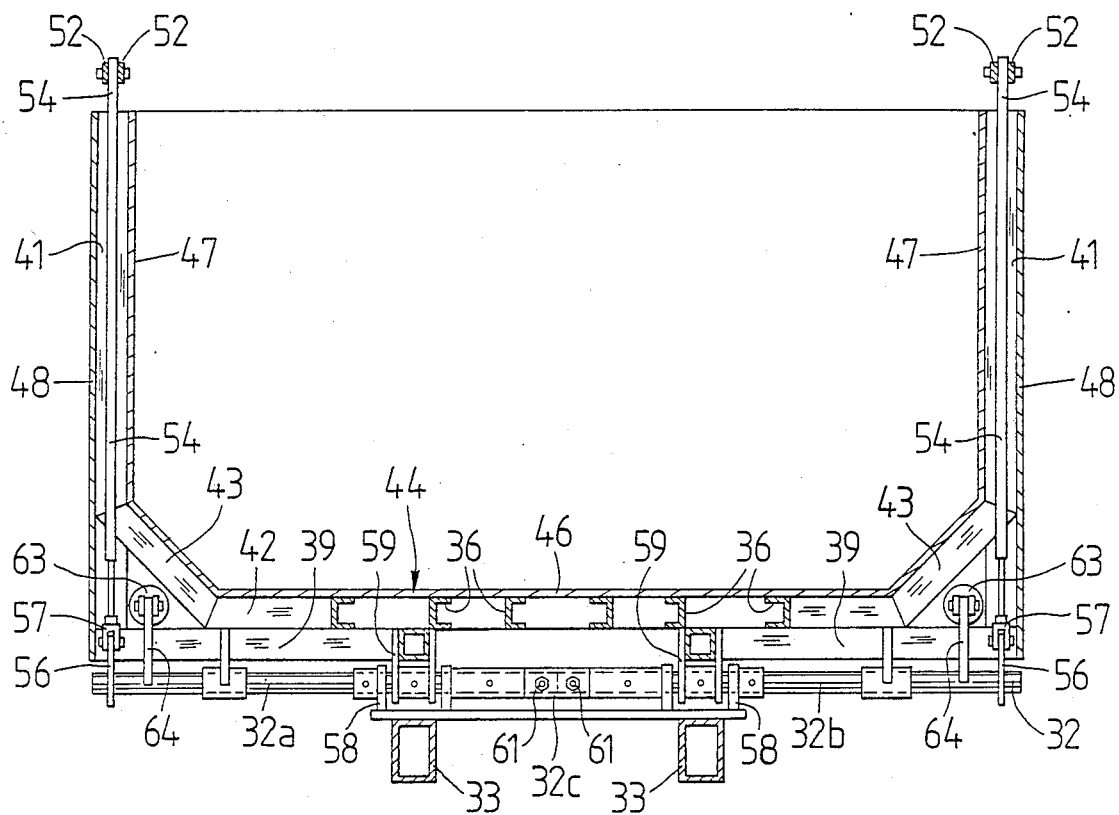
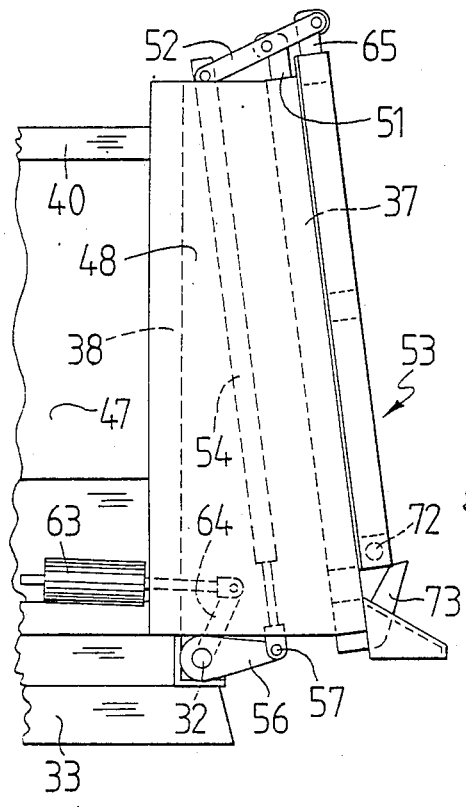
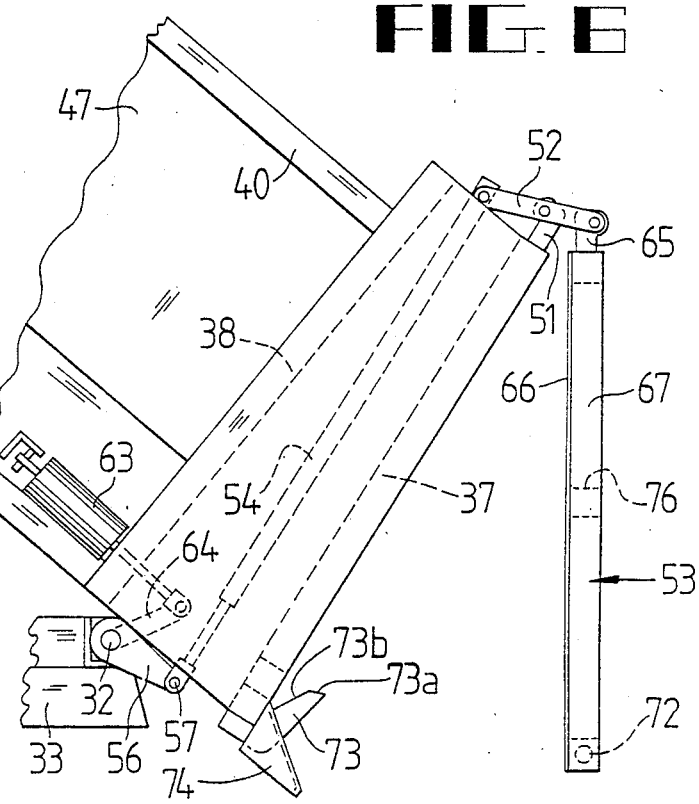

TAILGATE AND DUMP BODY ASSEMBLY

FIELD OF THE INVENTION

The present invention relates to dump bodies and in particular to dump bodies which are pivotally mounted such that the front may be elevated and the contents removed through a rear tailgate. In even greater particularlity the present invention relates to an improvement in such dump bodies which enhances the longevity and operability of these tailgates.

BACKGROUND OF THE INVENTION

Dump bodies for industrial use, such as dump trucks and coal trucks, typically employ a tailgate which is pivotally mounted to the top of the side walls of the dump body such that it may swing between an open and closed position as the front of the dump body varies in elevation.

Due to the enormous tonnage carried by such trucks and the abuse engendered thereby the side walls of such truck bodies and the tailgates are subject to distortion which diminishes the ability of the tailgate and body to form a proper seal. Therefore gravel, sand or other particulate matter can escape through the resulting gap. Furthermore, the retaining fingers of the prior art which hold the tailgate closed are also subjected to distorting forces and are oftentime broken or weakened by lateral movement of the tailgate relative to the sidewalls of the truck body. Consequently, it is not uncommon for the tailgate to become unfastened and the load to be dumped unexpectedly, such as in the middle of a highway or atop a weight scale.

SUMMARY OF THE INVENTION

It is the object of the invention to provide a tailgate and body assembly which remains in alignment without degradation of the seal therebetween.

Another object of the invention is to provide a tailgate and body assembly which is positively secured to prevent inadvertent gate openings.

Yet another object of the invention is to provide an automatic tailgate which will open and close responsive to the elevation of the dump body.

Another object of my invention is to provide a tailgate and body assembly which seals more tightly as the component surfaces wear.

These and other objects and advantages of my invention are accomplished through maximizing the area of the body and tailgate which is available to form a seal therebetween. Additionally the body structure is improved to reduce distortion which affects the seal of the gate assembly.

Briefly, my improved tailgate and body assembly utilizes a plurality of U-shaped support members to give strength to the bed and side walls. The bed and side walls terminate at one such U-shaped support member, thus this support member forms the sealing surface against which the gate is held when in the closed position. The gate has a frame member which is substantially identical to the U-shaped support member, thus the gate has a lateral dimension which is co-extensive with the dump body. The support members and frame members are preferentially three inch square steel tubing; therefore the sealing area between the tailgate and body assembly is three inches wide at the bed and each side wall of the dump body.

The bottom of the tailgate is held in the closed position by a set of stop members which extend from the rear of the body and combine with the terminal support member to form an upwardly opening V. The bottom of the tailgate is provided with a rounded region which rests in the V between the stop and the support member. A lift bar is pivotally attached to the top of the tailgate and is operatively connected to raise the tailgate above the height of the stop to allow the tailgate to swing open when the dump body is elevated.

By virtue of the wedging action of the rounded region within the V, the gate is held tightly against the dump body even as the rounded region and the stop wear.

BRIEF DESCRIPTION OF THE DRAWINGS

Apparatus embodying features of my invention are illustrated in the accompanying drawings which form a portion of this invention and wherein:

FIG. 3 is a side elevation of my tail gate and body assembly with the gate raising mechanism shown in phantom;

FIG. 4 is a sectional view taken along the line 4—4 of FIG. 3;

FIG. 5 is a partial side elevation showing the tailgate in its raised position;

FIG. 6 is a partial side elevation showing the dump body raised and the tailgate open;

DESCRIPTION OF A PREFERRED EMBODIMENT

Figure 1:
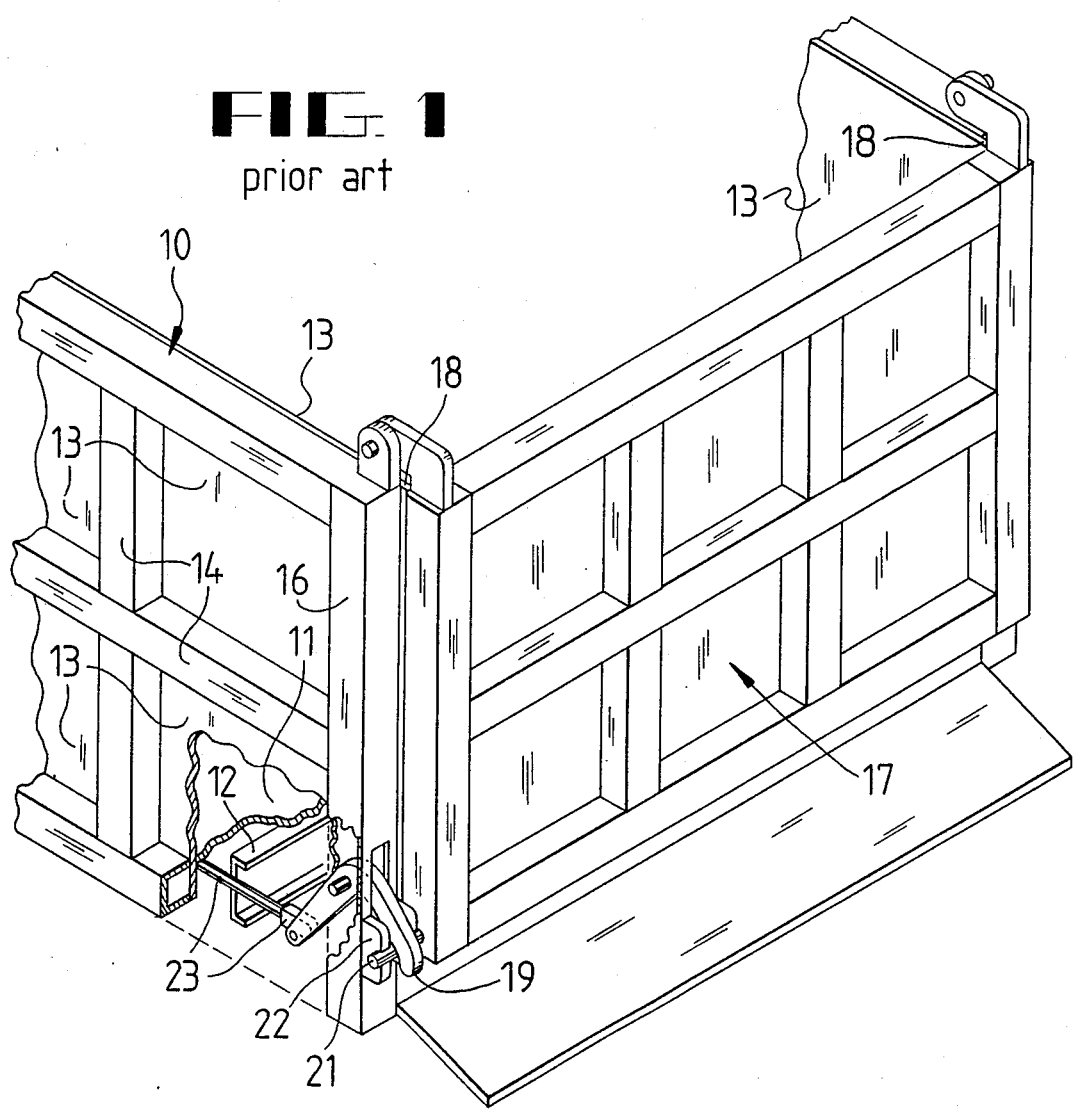
FIG. 1 is a perspective view partly in section showing a typical prior art tailgate and body assembly.
Figure 2:
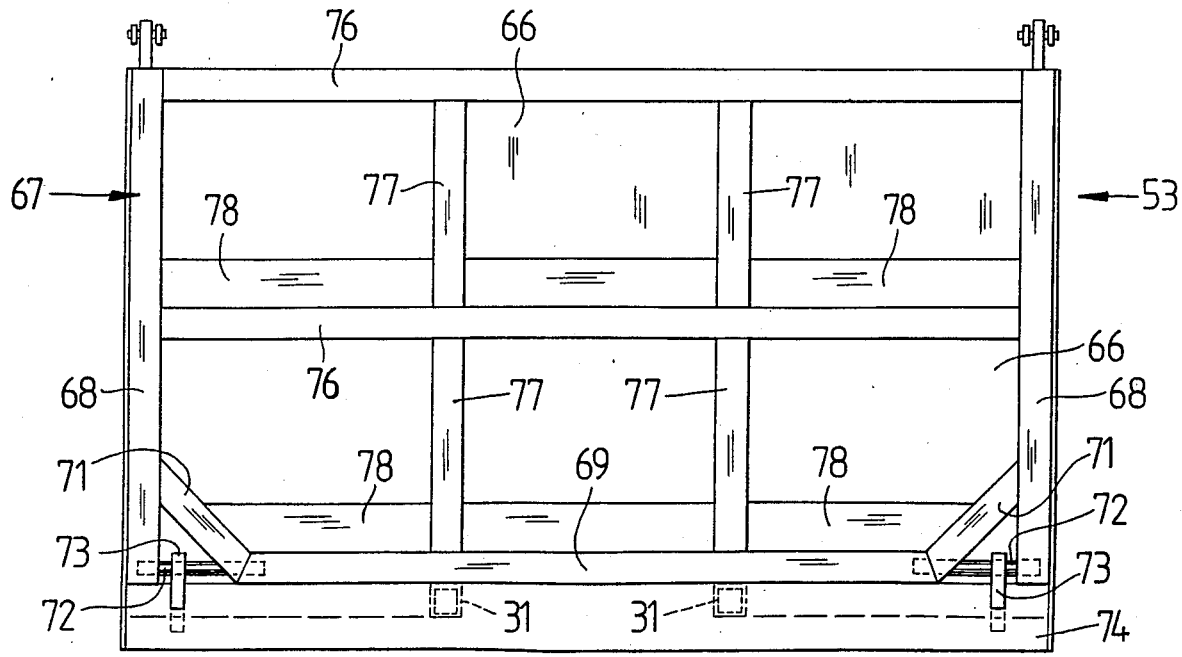
FIG. 2 is a rear elevation of my tailgate and body assembly in the closed position.

The novelty of my invention may be best understood by referring to the prior art as illustrated in FIG. 1. In the prior art the dump body 10 is formed by a bed 11 supported on a plurality of transverse beams 12. A plate-like side wall 13 is affixed to the bed 11 and to the ends of most of the beams 12 and is provided with shaped plate reinforcements 14 extending vertically and longitudinally along the side wall 13. The rear of the side walls 13 are reinforced by a formed sheet metal column 16. A tail gate 17 is hinged to the top of the dump body atop this column 16 such that it will swing open when the front of the dump body is elevated.

The tailgate 17 is typically slightly wider than the separation of the column 16 at the rear of the side walls 13 such that the tail gate overlaps onto the column 16 by only about one-half inch. Normally, the sheet metal of the interior of the side wall forms a lip 18 which extends one-half to one inch rearwardly past the column 16 so that in the closed position the tailgate 17 rests against the lip 18. To secure the tailgate 17 in the closed position a latch finger 19 is movably mounted within column 16 such that the finger 19 may be lowered to engage a rod-like extension 21 carried on each side of the tailgate 17. One or more seats 22 are mounted to the column 16 adjacent the finger 19 and serve to reinforce the finger 19. The finger 19 is urged between an open and closed position by a mechanical linkage 23 actuated by a fluid powered cylinder, not shown.

Most dump bodies currently utilize the above structure with some minor variations. It will be appreciated that when these dump bodies are loaded they are subjected to high lateral stresses; therefore there is a tendency for the end of the side walls 13 carrying the tailgate to deform causing a lateral shift in the tailgate 17. A shift of only a few degrees by the side walls soon moves the tailgate 17 such that the one-half inch overlap with the column becomes zero or a gap on one side of the tailgate. The lip is also subjected to considerable abuse and is soon broken or bent out of shape. Also the lateral vibration of the tailgate 17 and side walls 13 soon bend and/or crack the latch fingers 19 and the seats 22 on each side of the tailgate 17, thereby compromising the integrity of the gate fastening mechanism. Also, as shown, in some models the mechanism for moving the latch finger necessitates shortening one of the transverse supports 12 at each end. This lessens the stability of the side walls which are generally not substantially affixed to these supports and are thus prone to lateral distortion and vibration.

With reference to FIGS. 2–6, my improved tailgate and body assembly rests on a pair of longitudinal support members 31 which are pivotally mounted on a shaft 32 carried by a chassis 33 or other undercarriage as shown in FIG. 4. In some instances, such as frameless trailers, the chassis will not be included as it forms no part of my invention. A plurality of transverse U-shaped support members 34 are welded to the longitudinal supports 31 in spaced relation to one another and are interconnected by a plurality of longitudinal braces 36. The rearmost support or terminal support 37 may be inclined toward the front of the body. The terminal support 37 and an adjacent support 38 are additionally provided with an L-shaped brace 39 on each side extending beneath the support members 37 and 38 to the longitudinal supports 31. Each of the transverse supports 34, 36 and 37 include a pair of vertical sections 41, a horizontal section 42 welded to the longitudinal supports 31, and a pair of angle sections 43 which are connected to form an angle of about 45° with the ends of the horizontal section 42 and the vertical section 41. The vertical section 41 of supports 37 and 38 extend several inches above the vertical section 41 of the transverse support 34. The L-shaped braces 39 form an extension of vertical section 41 and form a triangle with the angle section 43 on the supports 37 and 38. The tops of each vertical section 41 on a common side are welded to a top runner 40.

A sheet metal plate 44 of an appropriate thickness is formed to be affixed within the transverse supports 34 as a unitized bed 46 and interior of a set of side walls 47. External plating 48 may be affixed to the transverse supports 34 to provide a double side wall wall construction.

Extending upwardly from and parallel to the vertical section 41 of terminal support 37 is a fulcrum arm 51 which carries a lift bar 52 pivotally mounted thereto. The lift bar 52 has one end pivotally attached to a tailgate 53 and the other end pivotally attached to a lift rod 54. In the embodiment shown in FIGS. 4–6 the lift rod 54 is connected at its other end with a clevis and pin attachment 57 to a lever 56 which is in turn carried by shaft 32. The shaft 32 is rotatably mounted within supports 58 and 59 to connect the dump body to the chassis 33. The shaft 32 is actually divided into two shaft sections 32$^a$ and 32$^b$ which are connected by a sleeve 32$^c$ and bolts 61 such that the shaft 32 can be disassembled and the dump body disconnected from the chassis 33.

A pair of linear actuators 63 are connected to a pair of radially extending projections 64 affixed to shaft 32 near each end thereof. The actuators are supported beneath the dump body such as by mounting within the triangle formed by the L-shaped brace 39 and the adjacent support 38. It may readily be seen that the actuator 63 may be mounted at various other locations on the dump body where they may be used to induce motion in the lift bar 51 and consequently in the tailgate 53.

The tailgate 53 has an inner plate 66 mounted on a support frame 67. The support frame 67 is identical in shape and configuration to the terminal support member 37, having a pair of vertical sections 68, a horizontal section 69 and a pair of angle sections 71. The vertical sections 68 extend downwardly coextensively with the bottom of the horizontal section 69. A rounded member 72, such as a two inch diameter steel rod, is supported in a horizontal position by the horizontal section 69 and each vertical section 68. This portion of the tailgate 53 is rounded for cooperation with a pair of stop members 73 which are attached to the L-shaped brace 39 of terminal support 37 and extend upwardly from an apron 74 carried by the dump body. The tailgate 53 is reinforced by a plurality of horizontal braces 76 and vertical braces 77 mounted inside the frame 67 and a plurality of bracing plates 78 welded between the inner plate 66 and the braces 76 and 77.

The tailgate 53 is connected to the dump body via an extension 65 of each vertical member 67. Each extension 65 is pivotally attached to the end of lift bar 52. The connection between the extension 65 and the lift bar 52 is such that when the tailgate is in its closed position the inner plate 66 rests against the terminal support 37 and the rounded member 72 rests between the terminal support 37 and the stop member 73 in a truncated V-shaped space formed therebetween.

· Each support member in the dump body and each frame member in the tailgate is made from three inch square tubular steel, thus when the tailgate 53 is closed the seal between inner plate 66 and terminal support member 37 is three inches wide. Therefore substantial deformation of the dump body must occur before a gap can be formed therebetween. To prevent such deformation the L-shaped braces 39 are also made from three inch square tubular steel and are welded to the terminal support 37 and adjacent support 38, thereby creating an extremely strong side wall construction.

To open the tailgate 53, the actuators 63 act through the linkage of projection 64, shaft 32, lever 56, lift rod 54 and lift bar 52 to raise the tailgate 53 to a height sufficient to allow the tailgate 53 to swing over the stop member 73 as the front of the dump body is elevated. The actuator 63 holds the linkage in position until the dump body is lowered whereupon the tailgate 53 swings back against the terminal support 37. The actuator then lowers the tailgate 53 such that the rounded member 72 descends into the space between the terminal support 37 and the stop member 73. Since this portion of the tailgate 53 is rounded it will descend within V-shaped space until a wedging action created by the narrowing shape of the space halts the descent of the tailgate 53. In actual practice a new tailgate and body assembly is provided with a V-shaped region that is one-half to one inch deeper than the initial stop position of the rounded member 72. Therefore as the rounded member or the stop becomes worn the actuator 63 and the weight of the tailgate cause the rounded member 72 to descend further and thereby maintain a wedged-tight seal between the inner plate 66 and the terminal support 37. It will be noted in FIGS. 5 and 6 that the stop members 73 have an upper surface 73$^a$ which is inclined toward the dump body and a wedging surface 73$^b$ which is considerably steeper than the upper surface 73$^a$. The inclination of the upper surface 73$^a$ will direct the rounded member 72 toward the V-shaped space if the rounded member comes to rest atop the stop member 73 while the wedging surface 73$^b$ holds the tailgate in its closed position.

Figure 7:
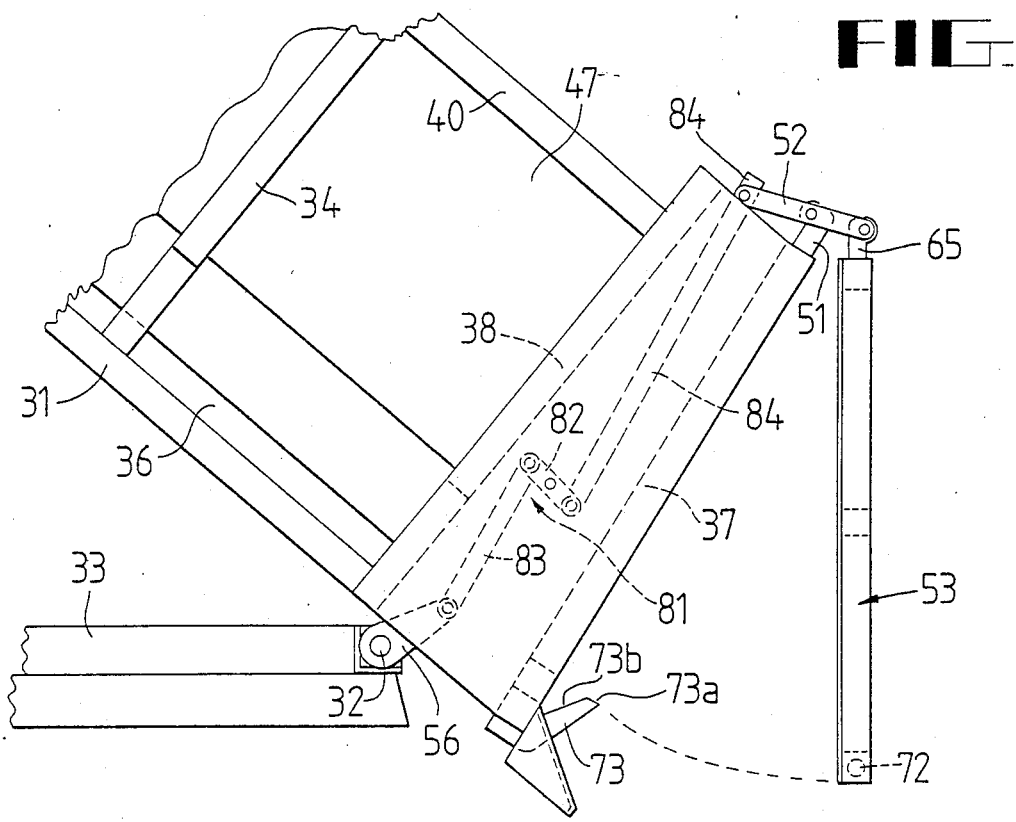
FIG. 7 is a partial side elevation of another embodiment of the tailgate opening mechanism; and, FIG. 8 is a partial side elevation of yet another embodiment.

In some instances it may be desirable to have the tailgate 53 open automatically when the dump body is elevated. The embodiments shown in FIGS. 7 and 8 accomplish this result. In FIG. 7 the shaft 32 is non-rotatably mounted so that lever 56 is fixed relative to the chassis 33. Intermediate lever 56 and lift bar 52 is a reversal linkage 81 which includes a cross member 82 pivotally mounted to the side wall and a pair of connecting links 83 and 84 connected at opposite ends of the cross member 82. As the dump body pivots about shaft 32, the distance between the lift arm 51 and the lever 56 decreases, thus link 84 pulls downwardly on lift arm 52, thereby raising the tailgate 53 sufficiently to allow the tailgate 53 to swing clear. In like manner, as the dump body is lowered the tailgate 53 swings to its closed position and is lowered into wedged engagement with the stop member 73.

Figure 8:
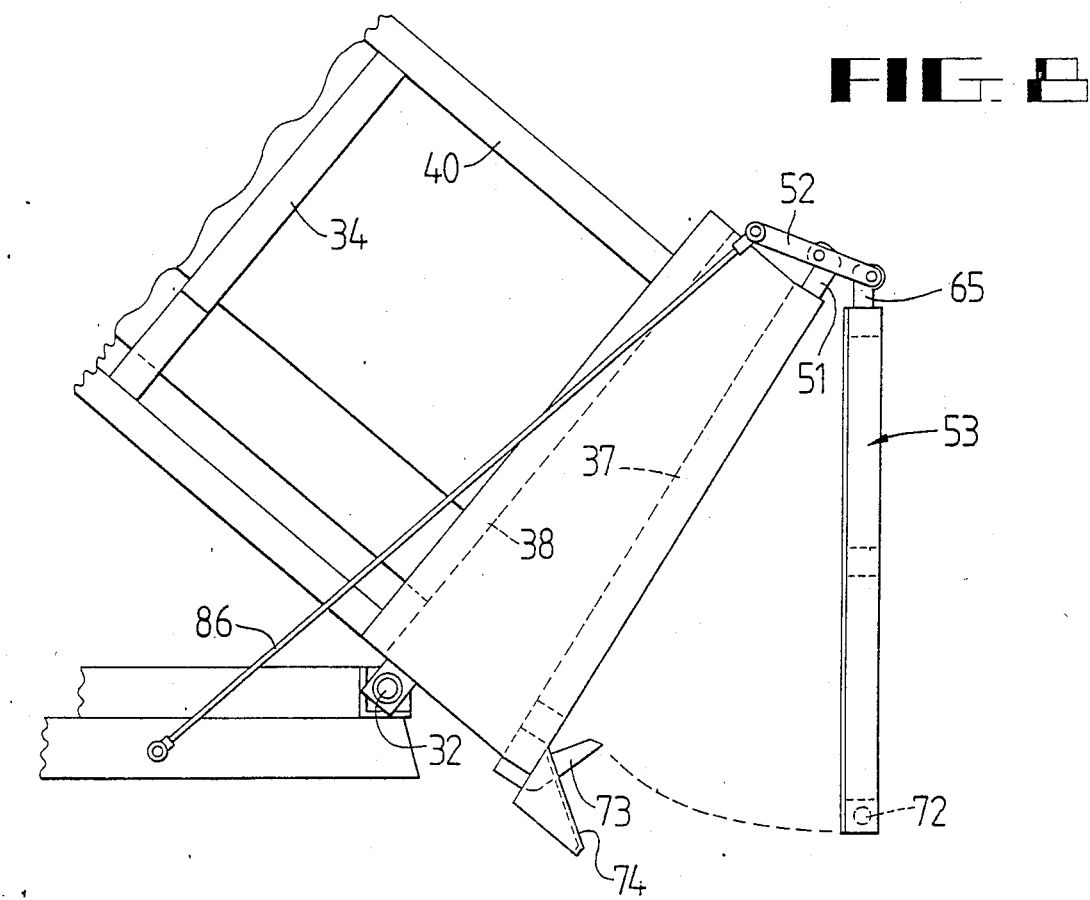

Alternatively, as shown in FIG. 8, an inelastic connector 86 such as a steel cable may be connected between lift bar 52 and a forward location on the chassis 33. As the dump body is elevated the connector 86 forces the lift bar 52 to pivot, thereby raising the tailgate relative to the stop member 73 such that the gate may swing to its open position. In either embodiment the measure of the angular rotation of the dump body necessary to release the tailgate 53 may be varied by the operative length of the connector 86 or the cross member 82.

My invention may also be used with trailers of the frameless type wherein no chassis is required to support the body, as is well known in the art. In such application the automatic release feature may be keyed from the front axle of the trailer.

While I have shown my invention in several forms, it will be obvious to one skilled in the art that it is not so limited, but is susceptible of various other changes and modifications without departing from the spirit thereof.

What I claim is:

1. In a dump body pivotally mounted about a pivot axis on an undercarriage and having side walls with an inclined rear profile:
    (a) a tailgate pivotally mounted at the top thereof for movement between an open position and a closed position with said tailgate having a width equal to the external width of said dump body at the rear of said side walls such that said tailgate and said dump body form a peripheral seal therebetween with said seal having a width substantially as wide as the thickness of said side walls, with said tailgate being generally rectangular in shape and having a rounded region along the lowermost side thereof adjacent the corner thereof;
    (b) stop members affixed to said dump body rearwardly of each of said side walls and inclined therefrom at an acute angle such that each said stop member and side wall form a truncated V-shaped space for receiving the bottom of said tailgate with said rounded region cooperatively positioned for engagement within said truncated V-shaped space when said tailgate is in said closed position with the apex of said truncated V-shaped space proximate the intersection of each said side wall and said adjacent stop member;
    (c) means carried by said side walls for raising said tailgate relative to said stop members to permit pivotal motion of said tailgate to said open position.

2. The dump body as defined in claim 1 wherein said means for raising said tailgate comprises:
    (a) lift bars pivotally mounted to the top of said side walls and having one end thereof pivotally connected proximate said side walls to the top of said tailgate to provide support thereto, such that the top of said tailgate is urged against said side walls to form said peripheral seal when said tailgate is closed;
    (b) a tailgate lift assembly including at least one linear actuator, a rotatable rod mounted along the pivot axis of said dump body and connected to said linear actuator for rotation responsive thereto, and lift rods connected between said rotatable rod and an end of said lift bar distal to said tailgate with said lift rod being movable vertically responsive to rotation of said rotatable rod.

3. The dump body as defined in claim 1 wherein said means for raising said tailgate comprises:
    (a) lift bars pivotally mounted to the top of said side walls and having one end thereof pivotally connected proximate said side walls to the top of said tailgate to provide support thereto, such that the top of said tailgate is urged against said side walls to form said peripheral seal when said tailgate is closed and having a second end;
    (b) a first link member depending from said second end;
    (c) a second link member pivotally mounted to said side walls and having one end thereof connected to said first link member and another end; and
    (d) a third link member connected between said another end and said undercarriage such that said first, second and third link members cooperate with said lift bar to raise said tailgate responsive to pivotal motion of said dump body lowering the rear of said side walls relative to said undercarriage.

4. A dump body as defined in claim 1 wherein said means for raising said tailgate comprises:
    (a) lift bars pivotally mounted to the top of said side walls and having one end thereof pivotally connected to said tailgate such that the top of said tailgate is urged against said side walls to form said peripheral seal when said tailgate is closed; and
    (b) an inelastic connector operatively connected between said undercarriage and said lift bars to cause vertical movement of said tailgate relative to said stops responsive to pivotal motion of said dump body relative to said undercarriage.

5. A dump body as defined in claim 1 wherein each of said stop members has an upper surface inclined toward said side walls for guiding said rounded portion into said truncated V-shaped space and a wedging surface deviating from a vertical plane sufficiently to form one side of said truncated V-shaped space such that said tailgate is urged against the rear of said side walls with increasing pressure as said tailgate is further engaged within said V-shaped space.

6. A dump body as defined in claim 1 further comprising a utilized bed and side wall assembly having a plurality of longitudinal support members; a plurality of transverse generally U-shaped support members carried by said longitudinal support members including a terminal member positioned at the rear of said assembly and an adjacent member spaced relative thereto with said terminal member inclined toward said adjacent member; and formed plate-like elements covering said U-shaped members to form a bed and side walls.

7. A dump body as defined in claim 6 wherein said tailgate includes a generally U-shaped frame member of the same size and shape as said terminal member such that said tailgate cooperates with said terminal member in said closed position to form a seal therewith along the length and width of said terminal member.

8. The dump body as defined in claim 7 wherein said means for raising said tailgate comprises:
  (a) lift bars pivotally mounted to the top of said side walls and having one end thereof pivotally connected to said tailgate proximate said side walls to provide support thereto such that the top of said tailgate is urged against said side wall when said tailgate is closed;
  (b) a tailgate lift assembly including at least one linear actuator, a rotatable rod mounted along the pivot axis of said dump body and connected to said linear actuator for rotation responsive thereto, and lift rods connected between said rotatable rod and an end of said lift bar distal to said tailgate with said lift rod being movable vertically responsive to rotation of said rotatable rod.

9. The dump body as defined in claim 6 wherein said means for raising said tailgate comprises;
  (a) lift bars pivotally mounted to the top of said side walls and having one end thereof pivotally connected proximate said side walls to the top of said tailgate to provide support thereto, such that the top of said tailgate is urged against said side walls to form said peripheral seal when said tailgate is closed and having a second end;
  (b) a first link member depending from said second end;
  (c) a second link member pivotally mounted to said side walls and having one end thereof connected to said first link member and another end; and
  (d) a third link member connected between said another end and said undercarriage such that said first, second and third link members cooperate with said lift bar to raise said tailgate responsive to pivotal motion of said dump body lowering the rear of said side walls relative to said undercarriage.

10. A dump body as defined in claim 6 wherein said means for raising said tailgate comprises an inelastic connector operatively connected between said undercarriage and the top of said tailgate such that said connector causes vertical movement of said tailgate relative to said stop members responsive to pivotal motion of said dump body relative to said undercarriage.

11. A dump body as defined in claim 6 wherein each of said stop members has an upper surface inclined toward said side walls for guiding said rounded portion into said truncated V-shaped space and a wedging surface deviating from a vertical plane sufficiently to form one side of said truncated V-shaped space such that said tailgate is urged against the rear of said side walls with increasing pressure as said tailgate is further engaged within said V-shaped space.

* * * * *